(12) United States Patent
Suemitsu (10) Patent No.: US 11,405,440 B2
(45) Date of Patent: Aug. 2, 2022

(54) CONTENT DISTRIBUTION DEVICE AND CONTENT DISTRIBUTION METHOD

(71) Applicant: Yamaha Corporation, Hamamatsu (JP)

(72) Inventor: Yuki Suemitsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 114 days.

(21) Appl. No.: 16/913,210

(22) Filed: Jun. 26, 2020

(65) Prior Publication Data

US 2020/0329086 A1 Oct. 15, 2020

Related U.S. Application Data

(63) Continuation of application No. PCT/JP2017/047409, filed on Dec. 29, 2017.

(51) Int. Cl.
*H04L 65/612* (2022.01)
*H04W 16/14* (2009.01)
(Continued)

(52) U.S. Cl.
CPC ......... *H04L 65/4084* (2013.01); *H04W 16/14* (2013.01); *H04W 72/02* (2013.01); *H04W 72/0453* (2013.01); *H04W 88/06* (2013.01)

(58) Field of Classification Search
None
See application file for complete search history.

(56) References Cited

U.S. PATENT DOCUMENTS 9,571,353 B1 * 2/2017 Chheda ............... H04L 41/0604
2006/0236352 A1 * 10/2006 Scott, III ........... H04N 7/17318
725/89

(Continued)

FOREIGN PATENT DOCUMENTS

JP 2015-528227 A 9/2015
WO WO 2017/030180 A1 2/2017
WO WO-2017030180 A1 * 2/2017 ............ H04W 84/12

OTHER PUBLICATIONS

International Preliminary Report on Patentability (PCT/IB/338 & PCT/IB/373) issued in PCT Application No. PCT/JP2017/047409 dated Jul. 9, 2020, including English translation of document C2 (Japanese-language Written Opinion (PCT/ISA/237) previously filed on Jun. 26, 2020) (six (6) pages).

(Continued)

*Primary Examiner* — Gregory B Sefcheck
*Assistant Examiner* — Srinivasa R Reddivalam
(74) *Attorney, Agent, or Firm* — Crowell & Moring LLP (57) ABSTRACT

A content distribution device sends control data or content data to a first content receiving device over a wireless communication channel in a first frequency band. The device also sends the content data to a second content receiving device via a wired communication channel or via a wireless communication channel in a second frequency band that is different from the first frequency band. The device detects a performance reduction of the wired communication channel or the wireless communication channel in the second frequency band. In response to the detection, the device starts to send the content data to the second content receiving device via the wireless communication channel in the first frequency band while sending of the control data or the content data to the first content receiving device.

16 Claims, 7 Drawing Sheets

(51) Int. Cl.
   *H04W 72/02*   (2009.01)
   *H04W 72/04*   (2009.01)
   *H04W 88/06*   (2009.01)

(56) References Cited

U.S. PATENT DOCUMENTS

| | | | |
|---|---|---|---|
| 2010/0161729 A1* | 6/2010 | Leblanc | H04L 69/28 |
| | | | 709/204 |
| 2013/0336499 A1 | 12/2013 | Beckhardt et al. | |
| 2015/0205805 A1 | 7/2015 | Gossain et al. | |
| 2017/0078812 A1 | 3/2017 | Gossain et al. | |
| 2017/0278537 A1* | 9/2017 | Sekiguchi | G06F 13/00 |
| 2017/0373890 A1* | 12/2017 | Fertonani | H04L 69/04 |
| 2018/0020497 A1* | 1/2018 | Shirai | H04W 40/34 |
| 2018/0352353 A1 | 12/2018 | Gossain et al. | |
| 2019/0222245 A1* | 7/2019 | Lim | H04W 72/12 |
| 2019/0373383 A1 | 12/2019 | Gossain et al. | |
| 2020/0153672 A1* | 5/2020 | Choi | H04L 5/0048 |

OTHER PUBLICATIONS

International Search Report (PCT/ISA/210) issued in PCT Application No. PCT/JP2017/047409 dated Mar. 27, 2018 with English translation (two (2) pages).
Japanese-language Written Opinion (PCT/ISA/237) issued in PCT Application No. PCT/JP2017/047409 dated Mar. 27, 2018 (three (3) pages).
Supplementary European Search Report issued in European Application No. 17936532.5 dated Jun. 23, 2021 (eight (8) pages).

* cited by examiner

| DESTINATION | DATA FORMAT | COMMUNICATION MODULE |
|---|---|---|
| CONTENT RECEIVING DEVICE 100A | LOSSLESS COMPRESSION | FIRST WIRELESS LAN |
| CONTENT RECEIVING DEVICE 100B | UNCOMPRESSED FORM | SECOND WIRELESS LAN |

FIG.3B

| DISTRIBUTOR | DATA FORMAT | COMMUNICATION MODULE |
|---|---|---|
| CONTENT DISTRIBUTION DEVICE 100 | LOSSLESS COMPRESSION | FIRST WIRELESS LAN |

FIG.3C

| DISTRIBUTOR | DATA FORMAT | COMMUNICATION MODULE |
|---|---|---|
| CONTENT DISTRIBUTION DEVICE 100 | UNCOMPRESSED FORM | SECOND WIRELESS LAN |

FIG.5A

| DESTINATION | DATA FORMAT | COMMUNICATION MODULE |
|---|---|---|
| CONTENT RECEIVING DEVICE 100A | LOSSY COMPRESSION | FIRST WIRELESS LAN |
| CONTENT RECEIVING DEVICE 100B | LOSSY COMPRESSION | FIRST WIRELESS LAN |

FIG.5B

| DISTRIBUTOR | DATA FORMAT | COMMUNICATION MODULE |
|---|---|---|
| CONTENT DISTRIBUTION DEVICE 100 | LOSSY COMPRESSION | FIRST WIRELESS LAN |

FIG.5C

| DISTRIBUTOR | DATA FORMAT | COMMUNICATION MODULE |
|---|---|---|
| CONTENT DISTRIBUTION DEVICE 100 | LOSSY COMPRESSION | FIRST WIRELESS LAN |

CONTENT DISTRIBUTION DEVICE AND CONTENT DISTRIBUTION METHOD

CROSS-REFERENCE TO RELATED APPLICATION

This application is a continuation application of International Application PCT/JP2017/047409 filed on Dec. 29, 2017, the content of this application is incorporated herein by reference in their entirety.

BACKGROUND

1. Technical Field

The present disclosure relates to a content distribution device and a content distribution method, and in particular to content distribution by a plurality of communication units.

SUMMARY

The purpose of the present disclosure is to optimize the use of a plurality of communication units for content distribution.

Solution to Problem

A content distribution device comprising: at least one processor; and at least one memory device configured to store a plurality of instructions, which, when executed by the at least one processor, cause the at least one processor to: send control data or content data to a first content receiving device over a wireless communication channel in a first frequency band; send the content data to a second content receiving device by wire or over a wireless communication channel in a second frequency band which is different from the first frequency band; and start to send the content data to the second content receiving device in a case where it is determined that sending the content data to the second content receiving device by the wire or over the wireless communication channel in the second frequency band is not available, over the established wireless communication channel in the first frequency band while maintaining transmission of the control data or the content data to the first content receiving device.

A content distribution method comprising the steps of: Sending, with at least one processor operating with a memory device in a device, control data or content data to a first content receiving device over a wireless communication channel in a first frequency band; sending, with the at least one processor operating with a memory device in a device, the content data to a second content receiving device by wire or over a wireless communication channel in a second frequency band which is different from the first frequency band; and starting to send, with the at least one processor operating with a memory device in a device, the processing by a starting method, the content data to the second content receiving device in a case where it is determined that sending the content data to the second content receiving device by the wire or over the wireless communication channel in the second frequency band is not available, over the established wireless communication channel in the first frequency band while maintaining transmission of the control data or the content data to the first content receiving device.

DETAILED DESCRIPTION

Figure 1:
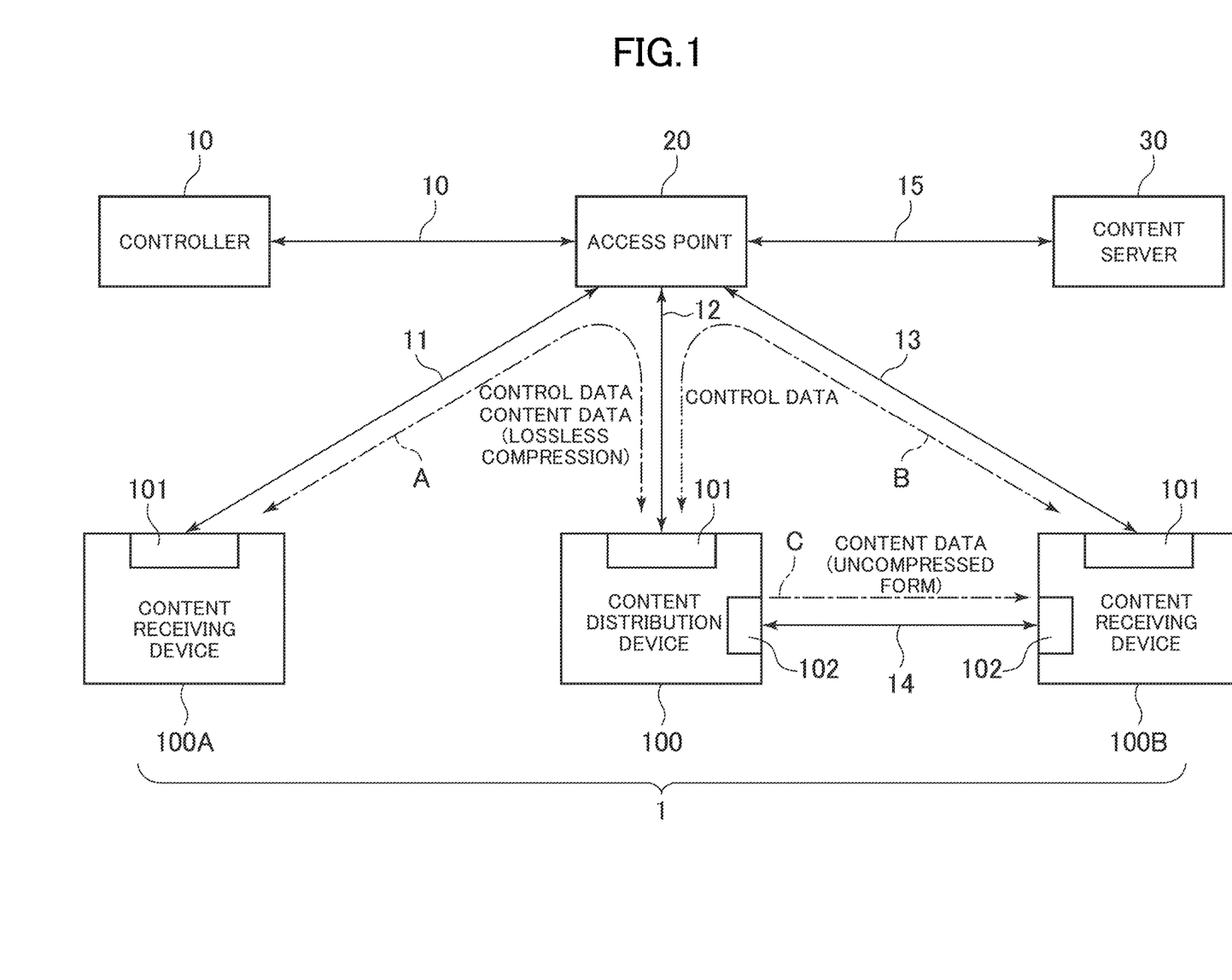
FIG. 1 is a diagram illustrating overall configuration of a content playback system according to an embodiment, and indicating situation in which data communication in a second communication frequency band is available.

FIG. 1 is a diagram illustrating overall configuration of a content playback system 1 according to the embodiment.

The content playback system 1 includes a content distribution device 100, a first content receiving device 100A, and a second content receiving device 100B. The content distribution device 100, the first content receiving device 100A, and the second content receiving device 100B each include communication functions that can connect to the network, and are connectable to a controller 10 and a content server 30 via an access point 20, such as a router.

The content of the content distribution device 100, the first content receiving device 100A, and the second content receiving device 100B include music, sound, text, image, and video, for example. In this embodiment, music is selected as the content. Further, an example will be described in which the content distribution device 100, the first content receiving device 100A, and the second content receiving device 100B are placed in different rooms, where the distribution device 100 distributes content by streaming to the first content receiving device 100A and the second content receiving device 100B, and the reproduction of music is thereby synchronized between these three devices. In other words, the content distribution device 100, the first content receiving device 100A, and the second content receiving device 100B are grouped, and the content distribution device 100 and the controller 10 memorize that these devices belong to the same group. A user may freely determine and change group information that indicates configuration of the group with the use of the controller 10, for example.

The controller 10 is implemented by installing an application corresponding to the content distribution system 1 in a general-purpose computer, such as a smartphone, a tablet, and a personal computer. In this regard, the controller 10 may be implemented as a dedicated machine. In any case, the controller 10 includes communication functions that can connect to the network. The controller 10 sends control data to the content distribution device 100, the first content receiving device 100A, and the second content receiving device 100B to control these devices based on the user's operation. The control data may be a command to start or stop music or to specify music to playback. The control data from the controller 10 is sent to the content server 30, the content distribution device 100, the first content receiving device 100A, and the second content receiving device 100B via the access point 20 such as a router.

In this embodiment, the controller 10 includes a touch panel, for example, and when the user operates the touch panel, the control data is sent to the network. The storage unit of the controller 10 may store identification information of the content distribution device 100, the first content receiving device 100A, and the second content receiving device 100B, or identification information of the rooms where the devices are placed as the group information described above.

The content server 30 stores and manages the content reproduced by the content distribution device 100, the first content receiving device 100A, and the second content receiving device 100B, and have the communication functions that can connect to the network. The content server 30 may be a cloud server that provides a music streaming service, for example. Alternatively, the content server 30 may be a home NAS (Network Attached Storage).

The content server 30 distributes music content data (e.g., music streaming data) according to the control data received from the controller 10 and the content distribution device 100. The music content data is distributed to the content distribution device 100 via the access point 20. The content server 30 may distribute the content data to the first content receiving device 100A and the second content receiving device 100B via the access point 20.

The network may include a wireless LAN (Local Area Network), a wired LAN, and a WAN (Wide Area Network), for example. If all the devices are located in the home, the network may include a wireless LAN and a wired LAN. If the content server 30 is located on the Internet, the Internet, which is a WAN, is between the access point 20 and the content server 30, i.e., on a communication path 15. Wi-Fi (Wireless-Fidelity, registered trademark) may be used for the wireless LAN.

The communication frequency band used in the wireless LAN includes a first communication frequency band and a second communication frequency band. The first communication frequency band is used for communication of the control data and the content data, and in particular, used for communication via the access point 20. The second communication frequency band is mainly used for distribution of high-quality content data. The second communication frequency band is used for directly sending and receiving the content data between the content distribution device 100 and the first content receiving device 100A or between the content distribution device 100 and the second content receiving device 100B by a technology such as Wi-Fi Direct (registered trademark) without using the access point 20. In FIG. 1, the communication paths 10, 11, 12, and 13 are wireless communication in the first communication frequency band, and the communication path 14 is wireless communication in the second communication frequency band. The communication path 15 includes the Internet as described above.

In this embodiment, an example will be described in which the first communication frequency band is the 2.4 GHz band and the second communication frequency band is the 5 GHz band. The first communication frequency band is lower than the second communication frequency band, and has the longer radio wave arrival distance. The 5 GHz band, which is the second communication frequency band, has an advantage that communication can be performed without being affected by the electromagnetic wave leaked from a microwave oven for heating and cooking food using the electromagnetic wave of the 2.4 GHz band. The 5 GHz band has the shorter radio wave arrival distance than the first communication frequency band. The radio wave of 5 GHz band has relatively high straight travelling properties. For this reason, for example, when the content distribution device 100 distributes content data to the second content receiving device 100B using the second communication frequency band, if the content distribution device 100 is far away from the second content receiving device 100B or there is an obstacle between the content distribution device 100 and the second content receiving device 100B, it may be difficult to satisfactorily distribute the content data. Further, if the location of the content distribution device 100 or the second content receiving device 100B is moved while the content distribution device 100 distributes content data to the second content receiving device 100B, the distribution of the content data from the content distribution device 100 may be interrupted.

For transmitting content data from the content distribution device 100 to the second content receiving device 100B, it is desirable to use the second communication frequency band, which is hard to be affected by electromagnetic waves leaking from other electronic devices such as microwave ovens. However, when content data is sent and received using the second communication frequency band, if the distance between the content distribution device 100 and the second content receiving device 100B becomes long or there is an obstacle between the content distribution device 100 and the second content receiving device 100B, it is desirable to switch the frequency band for distributing content data from the second communication frequency band to the first communication frequency band so as to continue distribution of the content data.

Figure 2:
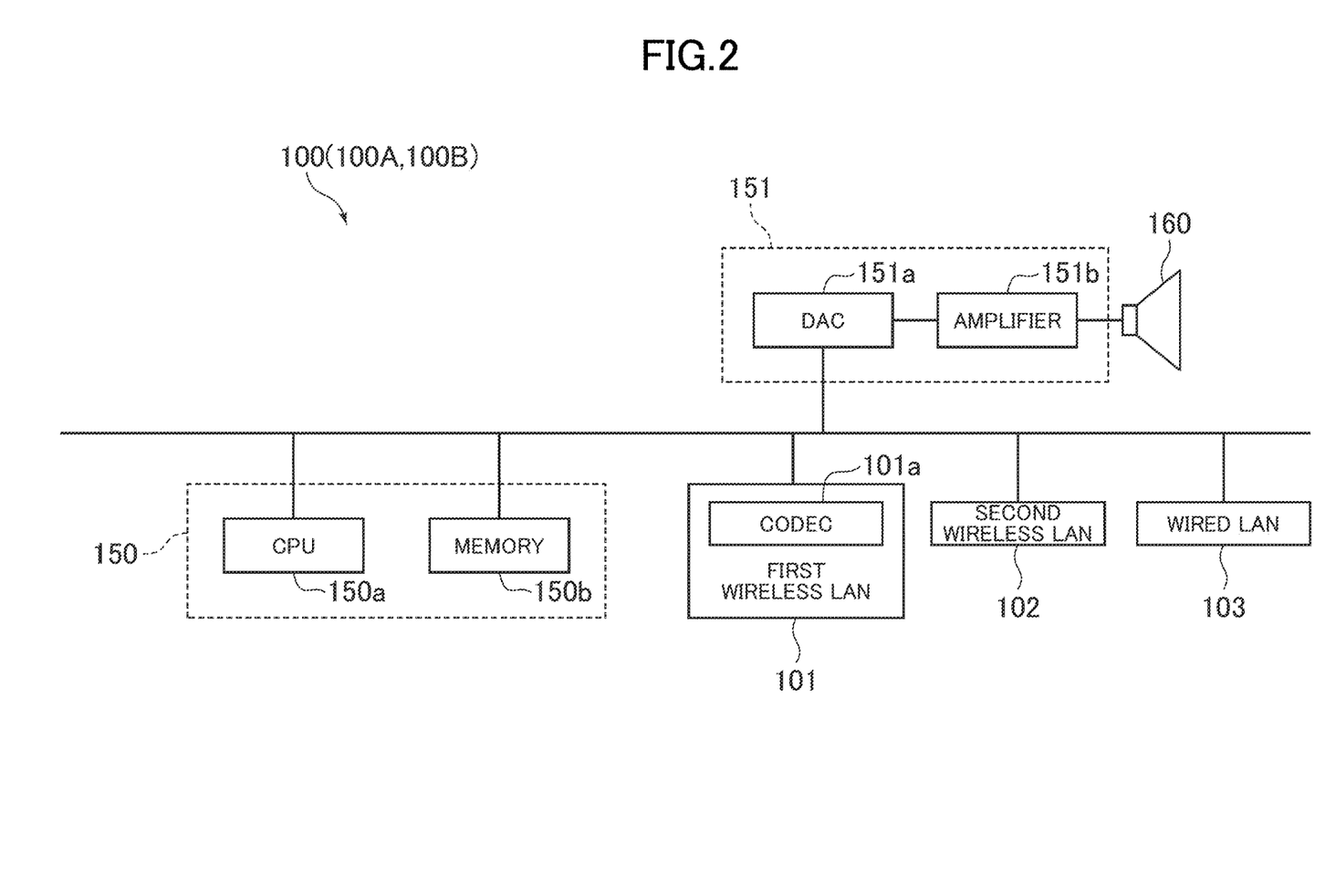
FIG. 2 is a diagram illustrating an example of a content distribution device and hardware configuration of the content distribution device.

Referring to FIG. 2, hardware configuration of the content distribution device 100 will be described. FIG. 2 is a diagram illustrating an example of the hardware configuration of the content distribution device 100. An example of the hardware configuration of the content distribution device 100 is shown here, although the second content receiving device 100B has the same configuration. The first content receiving device 100A has the same hardware configuration as the content distribution device 100 except that first content receiving device 100A does not have a second wireless LAN communication unit 102.

The content distribution device 100 is an audio device that replays audio and is composed mainly of computers. That is, the content distribution device 100 includes a CPU (Central Processing Unit) 150a connected to the bus, a memory 150b, a first wireless LAN communication unit 101, a second wireless LAN communication unit 102, a wired LAN communication unit 103, and a content playback unit 151. The CPU 150a and the memory 150b form the control unit 150. The content playback unit 151 is connected to external speakers 160. The content playback unit 151 may include speakers 160.

The memory 150b stores a control program according to this embodiment, and the CPU 150a executes the control program to control each unit of the content distribution device 100. The control program may be stored in the memory 150b at the time of the shipment of the content distribution device 100, or may be installed in the memory 150*b* from the recording media, such as optical and magnetic recording media, after the shipment of the content distribution device 100. Alternatively, the control program may be downloaded to the memory 150*b* from the Internet after the shipment of the content distribution device 100. The memory 150*b* may store other programs and data. The working area of the CPU 150*a* is also secured in the memory 150*b*.

The first wireless LAN communication unit 101 is a communication module that performs wireless communication over the first communication frequency band described above, and sends and receives the control data and the content data in the form of packets via the access point 20. For example, the first wireless LAN communication unit 101 receives control data sent from the controller 10 via the access point 20. The first wireless LAN communication unit 101 receives content data sent from the content server 30 via the access point 20. The first wireless LAN communication unit 101 can send the content data and the control data to the first content receiving device 100A and the second content receiving device 100B. The first wireless LAN communication unit 101 corresponds to, for example, IEEE 802.11 g and IEEE 802.11 n, and can perform communication using the first communication frequency band, which is the 2.4 GHz band. The wireless communication channel to be used in the first communication frequency band is set by the access point 20. For example, the surrounding radio wave condition is checked so as to select a wireless communication channel that is not used by the nearby access point. Alternatively, a wireless communication channel to be used may be manually selected.

The first wireless LAN communication unit 101 includes a CODEC 101*a*, and can apply lossless compression or lossy compression to the content data and send the compressed content data in a packet format. The compressed content data can be expanded by the CODEC 101*a*. That is, the CODEC 101*a* has an operation mode in which the content data is sent and received in lossless compression and an operation mode in which the content data is sent and received in lossy compression, and the control unit 150 determines one of the operation modes.

The second wireless LAN communication unit 102 is a communication module that performs wireless communication using the second communication frequency band described above, and sends and receives the content data directly to and from the first content receiving device 100A and the second content receiving device 100B in the form of packets without using the access point 20. The second wireless LAN communication unit 102 is used only for sending and receiving the content data, and not used for sending and receiving the control data. This serves to distribute high-quality content data. The second wireless LAN communication unit 102 corresponds to, for example, IEEE802.11a and IEEE802.11ac, and can perform communication using the second communication frequency band, which is the 5 GHz band. The wireless communication channel to be used in the second communication frequency band is set by the second wireless LAN communication unit 102. For example, the surrounding radio wave condition is checked so as to select a wireless communication channel that is not used by the nearby access point. Alternatively, a wireless communication channel to be used may be manually selected. Here, the second wireless LAN communication unit 102 is a separate piece of hardware from the first wireless LAN communication unit 101, although the functions of the first wireless LAN communication unit 101 and second wireless LAN communication unit 102 may be implemented by a single piece of hardware. For example, a single piece of communication hardware may perform wireless communication in the first communication frequency band and wireless communication in the second communication frequency band in a time-division manner.

The wired LAN communication unit 103 has a cable connector that enables to connect the content distribution device 100 to the wired LAN network in the home. This enables wired communication with other network devices using LAN cables. For example, if the second content receiving device 100B is also connected to the wired LAN network, the wired LAN communication unit 103 allows the content data to be wire-transmitted from the content distribution device 100 to second content receiving device 100B.

When sending the content data to other content receiving devices, the control unit 150 determines which of the first wireless LAN communication unit 101, the second wireless LAN communication unit 102, and the wired LAN communication unit 103 is used. Specifically, the control unit 150 selects one of the wired LAN communication unit 103, the second wireless LAN communication unit 102, and the first wireless LAN communication unit 101 as sending means of the content data in this order. This is because wired LAN communication channels are more reliable and faster than wireless LAN communications. Comparing the 2.4 GHz band with the 5 GHz band, the 5 GHz band has lower noise and lower latency because it does not go through the access point 20, and thus, the 5 GHz band is not affected by other wireless devices that use the access point 20. For this reason, the wired LAN communication unit 103 and the second wireless LAN communication unit 102 distributes the content data in uncompressed form. The first wireless LAN communication unit 101 distributes the content data in compressed form. As described later, the first wireless LAN communication unit 101 selects lossless compression or lossy compression, which has degraded quality but higher compression ratio (less data amount), according to the communication traffic on the selected communication channel of the first communication frequency band.

Here, assume a case where neither the content distribution device 100 nor the second content receiving device 100B is connected to the wired LAN network, and as shown in the communication path 15 in FIG. 1, the content distribution device 100 directly distributes the content data to the second content receiving device 100B by the second wireless LAN communication unit 102. The control data is sent and received via the first wireless LAN communication unit 101, the communication path 12, the access point 20, and the communication path 13.

The first content receiving device 100A does not have a communication module that corresponds to the second wireless LAN communication unit 102 As described above. Assume that the first content receiving device 100A is not connected to the wired LAN network. As such, the content distribution device 100 distributes the content data to the first content receiving device 100A by the first wireless LAN communication unit 101 via the communication path 12, the access point 20, and the communication path 11. Further, the content distribution device 100 sends and receives the control data to and from the first content receiving device 100A by the first wireless LAN communication unit 101 via the communication path 12, the access point 20, and the communication path 11.

Figure 3A:
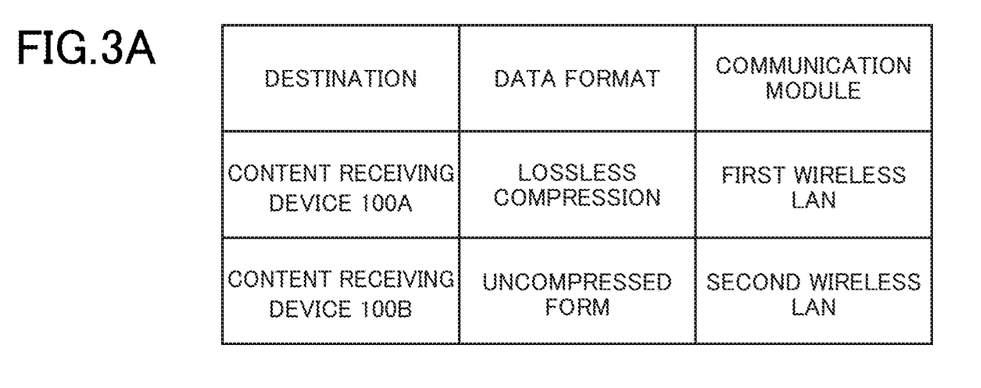
FIGS. 3A-3C schematically show communication setting data held in the content distribution device, a first content receiving device, and a second content receiving device in a situation in which the data communication in the second communication frequency band is available.
Figure 3B:
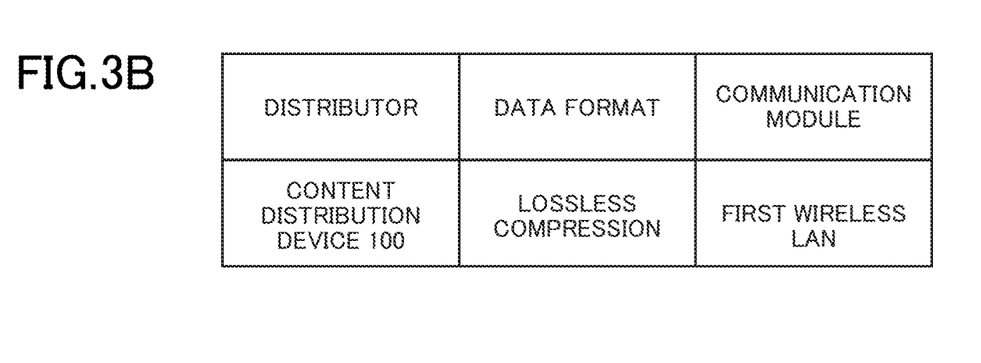
Figure 3C:
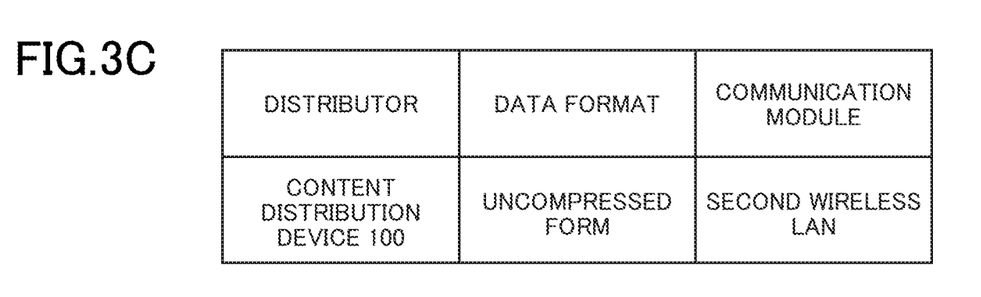

FIGS. 3A-3C schematically show the communication setting data held in the content distribution device 100, the first content receiving device 100A, and the second content receiving device 100B in the communication status shown in FIG. 1. As shown in FIG. 3A, the content distribution device 100 stores: transmitting the content data in lossless compression to the first content receiving device 100A, which is one of the destinations of content data, by using the first wireless LAN communication unit 101; and transmitting content data in uncompressed form to the second content receiving device 100B, which is another destination of the content data, by using the second wireless LAN communication unit 102. As shown in FIG. 3B, the first content receiving device 100A stores receiving the content data in lossless compression from the content distribution device 100 using the first wireless LAN communication unit 101. Further, as shown in FIG. 3C, the second content receiving device 100B stores receiving the content data in uncompressed form from the content distribution device 100 using the second wireless LAN communication unit 102.

In the above situation, if the content distribution device 100 and the second content receiving device 100B are far away from each other, or if an obstacle exists between the content distribution device 100 and the second content receiving device 100B, communication in the second communication frequency band becomes difficult or impossible. The control unit 150 of the content distribution device 100 sends an echo request to the second content receiving device 100B during the distribution of the content data. If an echo response is not received in response to the echo request within a predetermined period of time, the control unit resends the echo request. If an echo response is also not received in response to the resent echo request within the predetermined period of time, it is determined that communication in the second communication frequency band is no longer possible, and the control unit 150 interrupts communication. As described above, when communication in the second communication frequency band becomes difficult, indexes of communication quality also deteriorate. For example, a level of a received signal detected by the second wireless LAN communication unit 102 decreases, and the number of received errors detected by the second wireless LAN communication unit 102 increases. The SN ratio (signal-to-noise ratio) also decreases. As such, the control unit 150 may interrupt the communication when determining that the communication in the second communication frequency band is no longer possible in a case where the communication quality indexes satisfies the predetermined conditions, such as, when the reception level is below the predetermined value, when the reception error continues more than the predetermined number of times, or when the SN ratio is below the predetermined value. When the communication in the second communication frequency band is interrupted, the control unit 150 of the content distribution device 100 determines to use the first wireless LAN communication unit 101 to send the content data to the second content receiving device 100B. In this case, the communication with the first content receiving device 100A using the first wireless LAN communication unit 101 is maintained.

At that time, the control unit 150 uses the frequency channel already set in the first communication frequency band so as to send the content data to the second content receiving device 100B. As described above, the first wireless LAN communication unit 101 sends the content data and the control data in the form of packets to the first content receiving device 100A. The first wireless LAN communication unit 101 also sends the control data in the form of packets to the second content receiving device 100B. As such, the control unit 150 sends the content data for the second content receiving device 100B to the first wireless LAN communication unit 101. The first wireless LAN communication unit 101 packetizes the received content data and sends these packets to the second content receiving device 100B. The first wireless LAN communication unit 101 sends the packets generated from the control data and the content data for the first content receiving device 100A and the packets generated from the control data and the content data for the second content receiving device 100B in the predetermined order. In this way, the first wireless LAN communication unit 101 sends data in the form of packets, and thus, sending the content data to the second content receiving device 100B can be started promptly even if communication has already been performed over the same communication channel. That is, the content distribution device 100, the first content receiving device 100A, and the second content receiving device 100B share the wireless communication channel that is set to the access point 20. Of course, the wireless communication channel of the access point 20 may also use other wireless devices (not shown).

As described, the wireless communication channel of the access point 20 is shared by multiple wireless devices, and the network delay may thus occur. This network delay may interrupt the playback sound of the content. As such, when the control unit 150 of the content distribution device 100 switches the frequency band to be used to send the content data to the second content receiving device 100B from the second communication frequency band to the first communication frequency band, the data method of content data to the second content receiving device 100B is switched from the uncompressed form to the compressed form. This serves to reduce communication traffic and network delay.

The control unit 150 of the content distribution device 100 determines whether lossless compression or lossy compression is used as the compressed form in accordance with an index of the communication traffic in the wireless communication channel of the first frequency band. For example, lossless compression is used when the index of the communication traffic is less than a threshold value, and lossy compression is used when the index of the communication traffic is greater than or equal to the threshold value, in which the sound quality is reduced but the compression ratio is higher. The index of communication traffic can be obtained by monitoring the communication over the wireless communication channel of the first frequency band using the first wireless LAN communication unit 101 and the control unit 150. For example, the index may be the total number of packets sent and received per unit time over the wireless communication channel of the first frequency band. In addition, the index may be the number of destinations of packets sent and received within a predetermined time period, that is, the number of wireless devices with which the access point 20 is communicated. The index may also be the number of content receiving devices (up to two here) to which the content data is sent by the first communication unit 101 from the content distribution device 100.

For the content data sent to the first content receiving device 100A, the control unit 150 may also change the data format from lossless compression to lossy compression, which has a higher compression ratio. For example, lossless compression is continuously used when the index of the communication traffic is less than the threshold value, and lossy compression is used when the index of the communication traffic is greater than or equal to the threshold value, in which the sound quality is reduced but the compression ratio is higher. This serves to further reduce the possibility of network delay.

Figure 4:
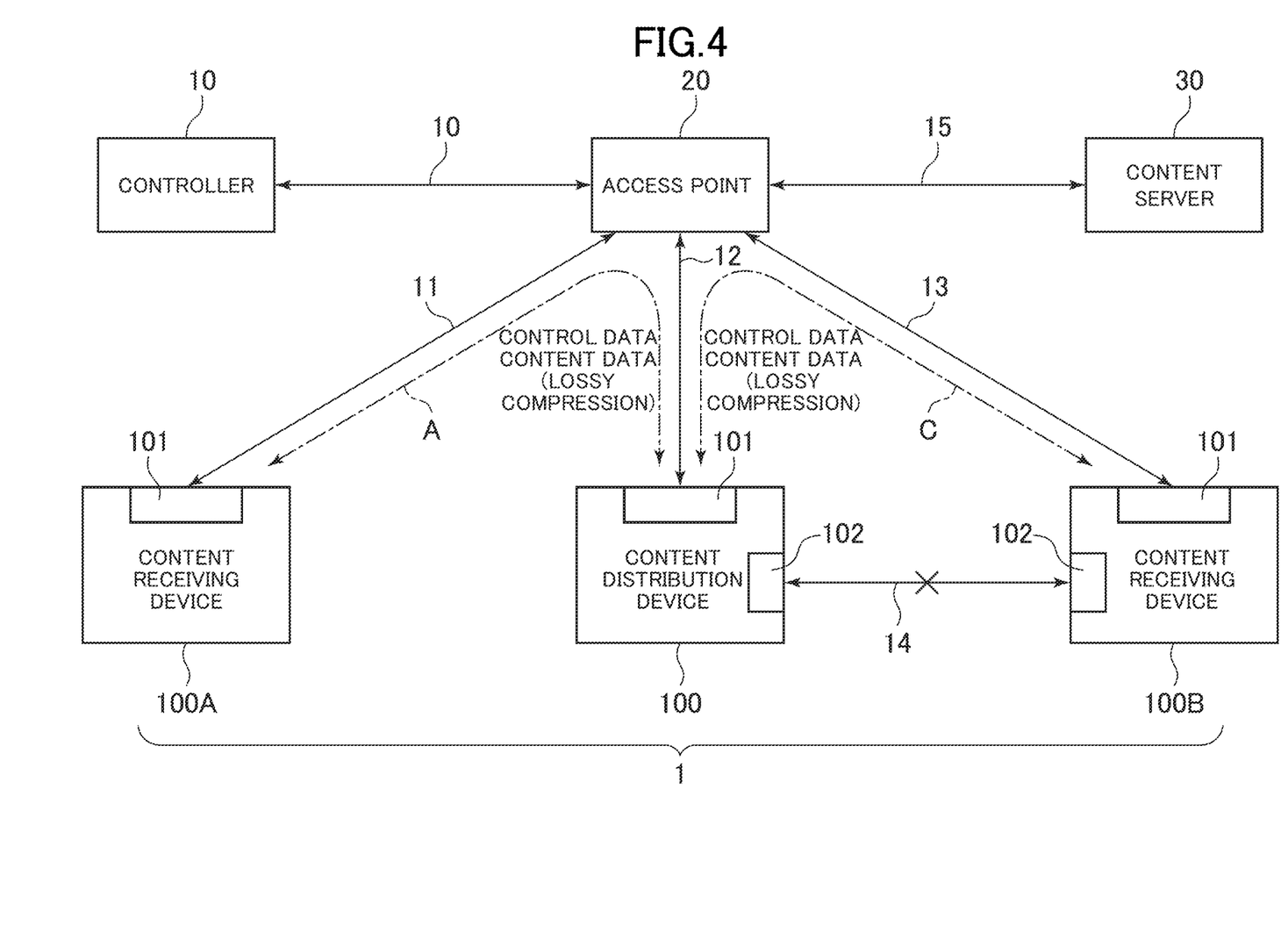
FIG. 4 is a diagram illustrating overall configuration of the content playback system according to an embodiment, and indicating a situation in which data communication in the second communication frequency band is not available.

FIG. 4 shows the situation in which data communication in the second communication frequency band is detected as no longer available or otherwise reduced in performance between the content distribution device 100 and the second content receiving device 100B after the situation shown in FIG. 1. In FIG. 1, the second wireless LAN communication unit 102 distributes the content data in the uncompressed form to the second content receiving device 100B, while in FIG. 4, the first wireless LAN communication unit 101 distributes the content data in the lossy compression. The lossy compression is used instead of the lossless compression because the content distribution device 100 sends data to two devices, the first content receiving device 100A and the second content receiving device 100B.

In FIG. 1, the first wireless LAN communication unit 101 distributes the content data in the lossless compression to the first content receiving device 100A, while in FIG. 4, the first wireless LAN communication unit 101 distributes the content data in the lossy compression. The lossy compression is used instead of the lossless compression because the content distribution device 100 sends data to two devices, the first content receiving device 100A and the second content receiving device 100B.

Figure 5A:
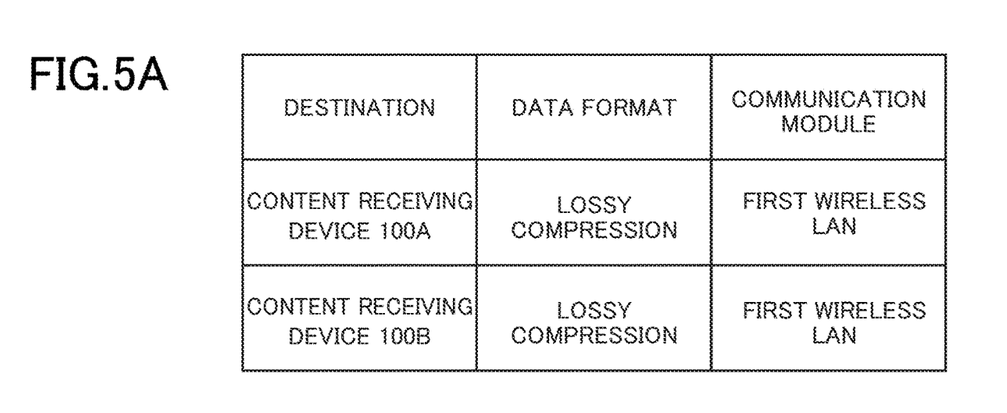
FIGS. 5A-5C schematically show communication setting data held in the content distribution device, a first content receiving device, and a second content receiving device in a situation in which the data communication in the second communication frequency band is not available.
Figure 5B:
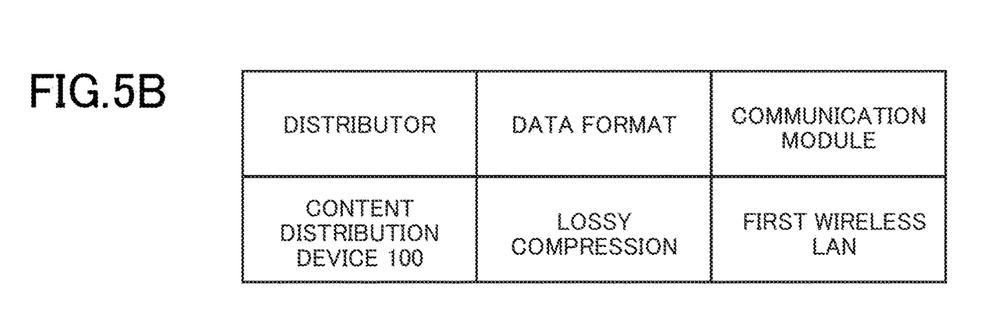
Figure 5C:
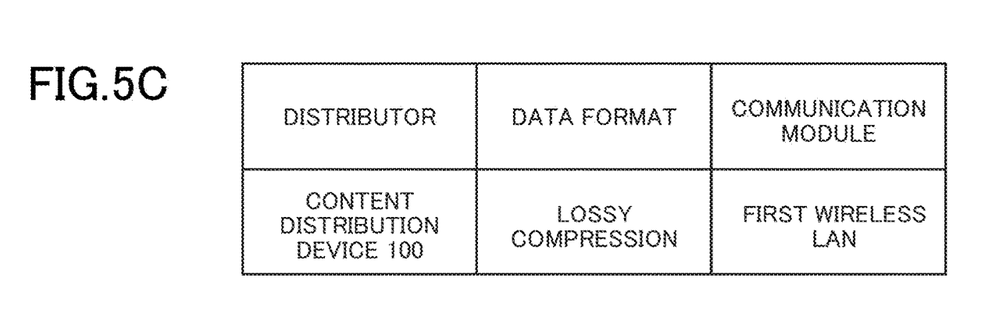

FIGS. 5A-5C schematically shows the communication setting data held in the content distribution device, the first content receiving device, and the second content receiving device in the communication status shown in FIG. 4. As shown in FIG. 5A, the content distribution device 100 stores sending content data in lossy compression to the first content receiving device 100A and the second content receiving device 100B using the first wireless LAN communication unit 101. As shown in FIGS. 5B and 5C, the first content receiving device 100A and the second content receiving device 100B store receiving the content data in lossy compression from the content distribution device 100 using the first wireless LAN communication unit 101.

The content playback unit 151 includes a digital-analog converter 151a and an amplifier 151b. Content data in uncompressed form is entered into the digital-analog converter 151a, and an analog musical tone signal is generated from the content data. The generated analog musical tone signal is amplified by the amplifier 151b, and musical tones are output from the speakers 160. The control unit 150 may use the first wireless LAN communication unit 101, the second wireless LAN communication unit 102, or the wired LAN communication unit 103 to receive content data from the content server 30 or the content distribution device 100, for example, and enter the received content data in the content playback unit 151. Further, the control unit 150 may obtain content data from a storage medium (not shown), such as an optical disk and a USB (Universal Serial Bus-registered trademark), inserted into the content distribution device 100, or from the built-in storage device (not shown), such as a hard disk, of the content distribution device 100. The content data thus obtained is also entered into the content playback unit 151, and the musical tones are output from the speakers 160.

Next, operations of the content playback system 1 will be specifically described.

Figure 6A:
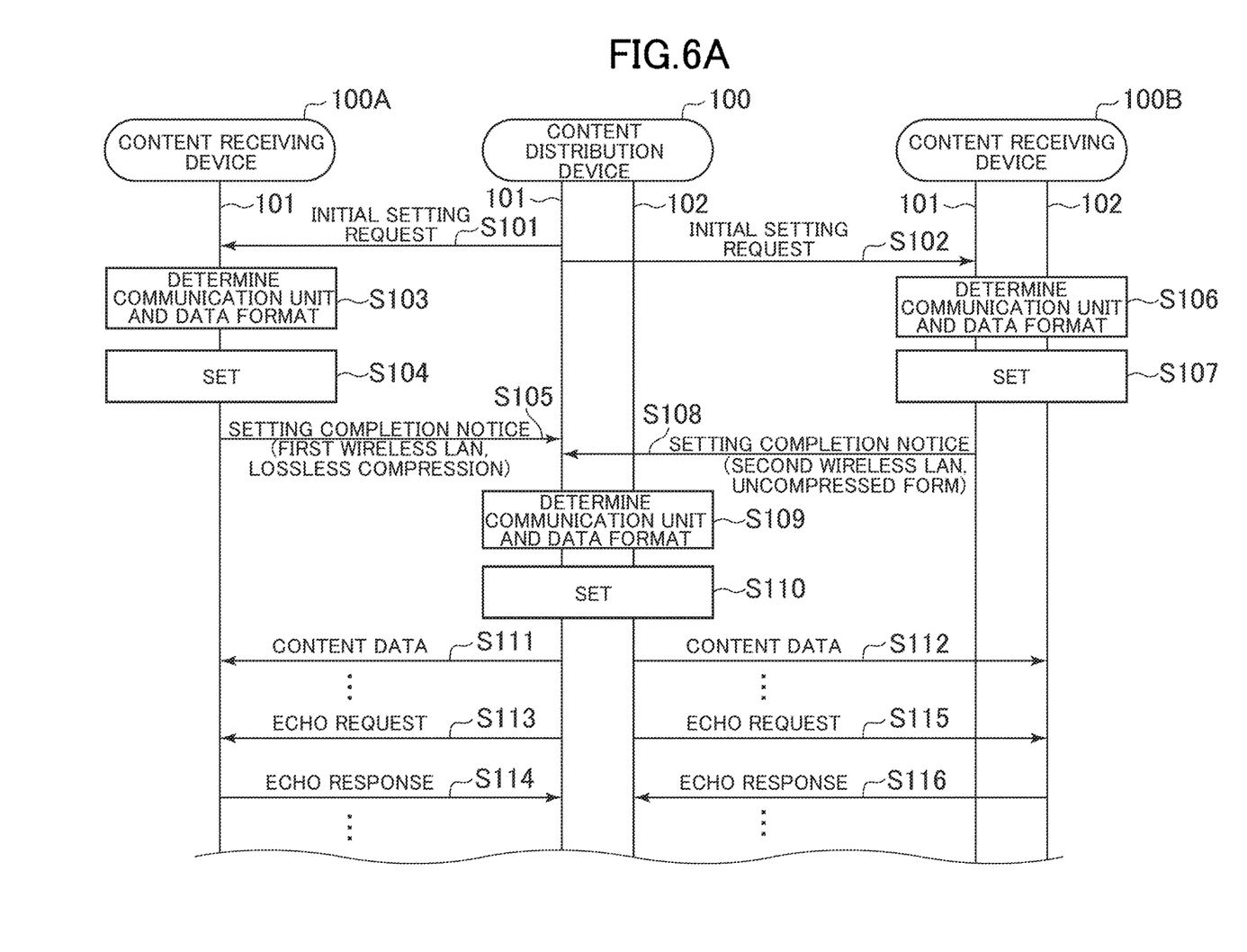
FIG. 6A is a sequence showing operation of the content playback system according to an embodiment.
Figure 6B:
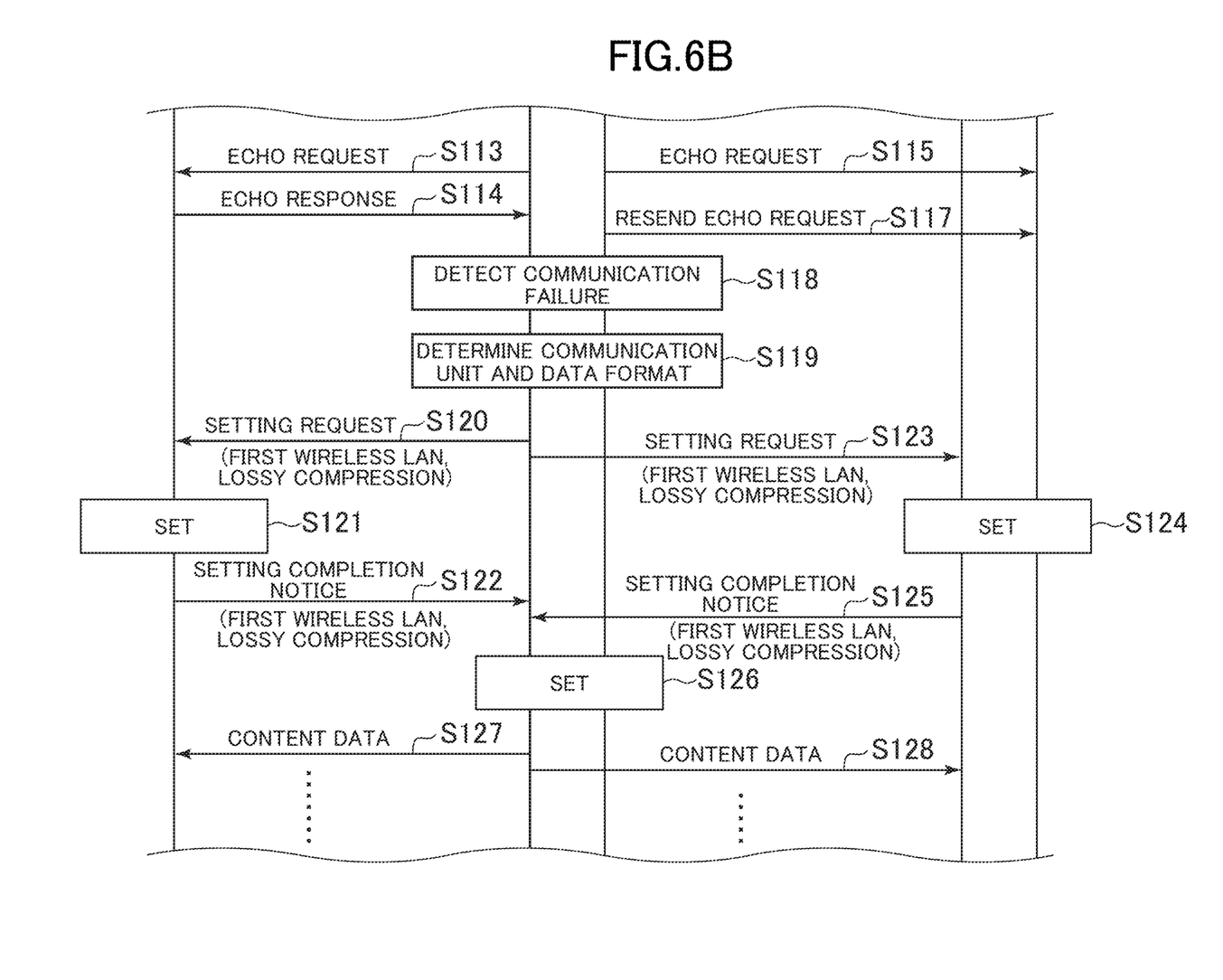
FIG. 6B is a sequence showing operation of the content playback system according to an embodiment.

FIGS. 6A and 6B are sequences showing the operation of the content playback system 1. FIGS. 6A and 6B show the operation of streaming distribution of content data from the content distribution device 100 to the first content receiving device 100A and the second content receiving device 100B. The content data to be distributed may be stored in the content distribution device 100 in advance, or may be received by the content distribution device 100 from the content server 30 in real time.

First, the control unit 150 of the content distribution device 100 sends a request for setting the communication unit and the data format to each of the first content receiving device 100A and the second content receiving device 100B (S101, S102). If the content distribution device 100 has not yet distributed content data to the content receiving devices 100A and 100B, the content distribution device 100 does not have information about the communication units implemented in the content receiving devices 100A and 100B. As such, the initial setting request does not include the designation of the communication unit. The initial setting request includes uncompressed or lossless compression as the data format.

In this embodiment, the first content receiving device 100A includes the first wireless LAN communication unit 101 and the wired LAN communication unit 103, but is not connected to a wired LAN and can use only the first wireless LAN communication unit 101. The second content receiving device 100B has all of the first wireless LAN communication unit 101, the second wireless LAN communication unit 102, and the wired LAN communication unit 103, but is not connected to a wired LAN and can use only the first wireless LAN communication unit 101 and the second wireless LAN communication unit 102.

Upon receiving the setting request from the content distribution device 100, the first content receiving device 100A selects the first wireless LAN communication unit 101 as the communication unit with the highest priority among the available communication units. The first content receiving device 100A also selects the lossless compression, which has the highest priority in the data formats available in the first wireless LAN communication unit 101 (S103). The first content receiving device 100A then generates communication setting data shown in FIG. 3B in the communication unit and the data format selected in S103, stores the generated data in the memory 150b, and sets the CODEC 101a to the lossless compression mode according to the communication setting data (S104). Subsequently, the first wireless LAN communication unit 101 sends a setting completion notice to the content distribution device 100 (S105). The setting completion notice includes information indicating that the first content receiving device 100A has selected the first wireless LAN communication unit 101 and the lossless compression.

Upon receiving the setting request from the content distribution device 100, the second content receiving device 100B selects the second wireless LAN communication unit 102 as the communication unit with the highest priority among the available communication units. The second content receiving device 100B also selects uncompressed form as the only data format available in the second wireless LAN communication unit 102 (S106). The second content receiving device 100B then generates communication setting data shown in FIG. 3C in the communication unit and the data format selected in S106, and stores the generated data in the memory 150b (S107). Subsequently, the first wireless LAN communication unit 101 sends a setting completion notice to the content distribution device 100 (S108). The setting completion notice includes information indicating that the second content receiving device 100B has selected the second wireless LAN communication unit 102 and the uncompressed form.

The control unit 150 of the content distribution device 100 determines a communication unit and a data format to be used for sending content data to the first content receiving device 100A and the second content receiving device 100B based on the setting completion notices received from the first content receiving device 100A and the second content receiving device 100B (S109). Specifically, the control unit 150 of the content distribution device 100 determines how many content receiving devices receive content data by the first wireless LAN communication unit 101 based on the setting completion notices received from the first content receiving device 100A and the second content receiving device 100B. If the number of the content receiving devices that receive content data by the first wireless LAN communication unit 101 is less than a threshold value (here, two), lossless compression is selected. If the number of the content receiving devices that receive content data by the first wireless LAN communication unit 101 is equal to or more than a threshold value, lossy compression is selected. In this case, a request for using lossy compression as a data format is sent to each content receiving device that receives content data by the first wireless LAN communication unit 101.

Here, only one first content receiving device 100A receives content data by the first wireless LAN communication unit 101, and thus, lossless compression is selected as the format of content data to be sent to the first content receiving device 100A. The communication setting data shown in FIG. 3A is generated and stored in memory 150b based on the contents thus determined and the setting completion notice received from each content receiving device. Further, the CODEC 101a of the content distribution device 100 is set to the lossless compression mode (S110).

Next, the content distribution device 100 sends content data in lossless compression to the first content receiving device 100A by the first wireless LAN communication unit 101 according to the communication setting data (S111). Further, the content distribution device 100 sends content data in uncompressed form to the second content receiving device 100B by the second wireless LAN communication unit 102 according to the communication setting data (S112).

The content distribution device 100 measures a playback delay time of each of the first content receiving device 100A and the second content receiving device 100B in advance, and stores the longer playback delay time as the maximum delay time. As such, after the content data is distributed, the content distribution device 100 reproduces and outputs musical sound after the maximum delay time has elapsed. In the first content receiving device 100A and the second content receiving device 100B, the device with the shorter playback delay time also waits until the maximum delay time elapses, and then reproduces and outputs the musical sound of the content data. In the first content receiving device 100A and the second content receiving device 100B, the device with the longer playback delay time reproduces and outputs content data immediately after receiving the content data. The content data can be thus synchronously reproduced by the content distribution device 100, the first content receiving device 100A, and the second content receiving device 100B.

While distributing content data, the content distribution device 100 periodically sends echo requests to the first content receiving device 100A by the first wireless LAN communication unit 101 (S113). On receiving an echo request, the first content receiving device 100A sends an echo response to the content distribution device 100 by the first wireless LAN communication unit 101 (S114). If an echo response is received within a predetermined period of time after the echo request is sent, the control unit 150 of the content distribution device 100 determines that the first wireless LAN communication unit 101 can continuously communicate with the first content receiving device 100A.

Similarly, while distributing content data, the content distribution device 100 also periodically sends echo requests to the second content receiving device 100B by the second wireless LAN communication unit 102 (S115). On receiving an echo request, the second content receiving device 100B sends an echo response to the content distribution device 100 by the second wireless LAN communication unit 102 (S116). If an echo response is received within a predetermined period of time after the echo request is sent, the control unit 150 of the content distribution device 100 determines that the second wireless LAN communication unit 102 can continuously communicate with the second content receiving device 100B.

However, an echo request is sent again if any trouble occurs in the communication using the second communication frequency band and thus the content distribution device 100 does not receive an echo response from the second content receiving device 100B within a predetermined period of time after the echo request is sent, for example, when the content distribution device 100 is far away from the second content receiving device 100B (S117). If the echo response is not received within a predetermined period of time after the echo request is sent again, the content distribution device 100 determines that the content distribution device 100 cannot communicate with the second content receiving device 100B (S118). Here, whether the second wireless LAN communication unit 102 can communicate with the second content receiving device 100B is determined by the presence of the echo response, but may also be determined by whether the indexes of communication quality described above satisfy the predetermined conditions.

In this case, the control unit 150 of the content distribution device 100 redetermines a communication unit to be used and a data format for distributing content data to the first content receiving device 100A and the second content receiving device 100B, respectively (S119).

Specifically, the control unit 150 of the content distribution device 100 determines to distribute the content data to the second content receiving device 100B by on the first wireless LAN communication unit 101, which has the next priority among the communication units available in the second content receiving device 100B.

Next, the first wireless LAN communication unit 101 counts the content distribution device 100 and the content receiving device that distribute content data. In this case, lossy compression is selected because two devices, the first content receiving device 100A and the second content receiving device 100B, receive content data by the first wireless LAN communication unit 101, which is equal to or more than the threshold value (two in this case). The control unit 150 of the content distribution device 100 requests the first content receiving device 100A to receive content data by the first wireless LAN communication unit 101 and to use lossy compression as the data format (S120).

The first content receiving device 100A generates communication setting data shown in FIG. 5B according to such a request, stores the generated data in the memory 150b, and sets the CODEC 101 to the lossy compression mode according to the communication setting data (S121). Subsequently, the first wireless LAN communication unit 101 sends a setting completion notice to the content distribution device 100 (S122). Such a setting completion notice includes that the first wireless LAN communication unit 101 receives the content data and that lossy compression is used as a data format. Similarly, the control unit 150 of the content distribution device 100 requests the second content receiving device 100B to receive content data by the first wireless LAN communication unit 101 and to use lossy compression as the data format (S123).

The second content receiving device 100B generates communication setting data shown in FIG. 5C according to such a request, stores the generated data in the memory 150b, and sets the CODEC 101 to the lossy compression mode according to the communication setting data (S124). Subsequently, the first wireless LAN communication unit 101 sends a setting completion notice to the content distribution device 100 (S125). Such a setting completion notice also includes that the first wireless LAN communication unit 101 receives the content data and that lossy compression is used as a data format. The second content receiving device 100B stores the received communication setting data in the memory 150b, and sets the CODEC 101a to the lossy compression mode according to the received communication setting data (S124). Subsequently, the first wireless LAN communication unit 101 sends a setting completion notice to the content distribution device 100 (S125).

When the setting completion notices are received from the first content receiving device 100A and the second content receiving device 100B, the communication setting data shown in FIG. 5A is generated based on the notices and stored in the memory 150b. Further, the CODEC 101a of the content distribution device 100 is set to the lossy compression mode (S126).

Subsequently, the content distribution device 100 sends the content data in lossy compression to the first content receiving device 100A by the first wireless LAN communication unit 101 according to the communication setting data (S127). Further, the content distribution device 100 sends the content data in lossy compression to the second content receiving device 100B by the first wireless LAN communication unit 101 according to the communication setting data (S128). When the content data is sent, the communication channel to be used in the first communication frequency band is not reconfigured, and the channel that is already configured is continuously used. This allows the distribution of content data to the second content receiving device 100B in the first communication frequency band to be started promptly. This also serves not to interrupt distribution of content data to the first content receiving device 100A, or to minimize the interruption time.

According to the content playback system. 1 described above, when changing the communication frequency band used for distributing the content data from the content distribution device 100 to the second content receiving device 100B, the frequency channel in the first communication frequency band used for communication of control data is simply used for communication of content data. By doing so, it is possible to avoid interrupting the distribution of the content data while searching a new channel, or to minimize the interruption time.

The content distribution device 100 selects one of compression formats with different compression ratios to be actually used for communication with the first content receiving device 100A or the second content receiving device 100B according to the number of content receiving devices that distribute content data in the first frequency band. This can reduce communication traffic on the frequency channel in the first frequency band.

In this regard, if the wired LAN communication unit 103 is detected as not available or otherwise reduced in performance, the content distribution device 100, the first content receiving device 100A, and the second content receiving device 100B download firmware from the Internet using the first wireless LAN communication unit 101. As such, the download timing of the latest firmware may be adjusted according to the communication traffic of the content data by the first wireless LAN communication unit 101.

Specifically, when the control units 150 of the content distribution device 100, the first content receiving device 100A, and the second content receiving device 100B update the firmware through the communication channel in the first frequency band, it may be determined whether to update the firmware immediately or after a predetermined period of time depending on the status of use of the frequency channel, such as the number of content receiving devices that receive the content data over the frequency channel, and the importance of the firmware to be updated, for example. For example, if the firmware update is of high importance, such update is prioritized and executed immediately even if the number of content receiving devices exceeds a predetermined value. On the other hand, if the firmware update is of low importance, such update may be executed immediately only when the number of content receiving devices is less than the predetermined value, and when the number of content receiving devices is equal to or more than the predetermined value, the update may be executed after a predetermined period of time has elapsed. This prevents network delays caused by firmware downloads.

The timing of firmware updates may be determined by the control units 150 of the first content receiving device 100A and the second content receiving device 100B, or may be represented by the control unit 150 of the content distribution device 100. In this case, the result of determination may be sent to the first content receiving device 100A and the second content receiving device 100B from the content distribution device 100.

In the above embodiment, the communication between the content distribution device 100 and the second content receiving device 100B is switched from the second wireless LAN communication unit 102 to the first wireless LAN communication unit 101. When the communication by the wired LAN communication unit 103 is switched to the communication by the first wireless LAN communication unit 101, the existing communication between the content distribution device 100 and the first content receiving device 100A may also be maintained in the same manner.

When the content distribution device 100 or the second content receiving device 100B periodically determines whether the communication by the second wireless LAN communication unit 102 is available, and if the communication is available, the communication by the first wireless LAN communication unit 101 may be switched to the communication by the second wireless LAN communication unit 102. Whether the communication by the second wireless LAN communication unit 102 is available can be determined by, for example, if there is an echo response from the second content receiving device 100B to an echo request sent from the content distribution device 100, and if an index of the communication quality obtained in the content distribution device 100 and/or the second content receiving device 100B satisfies the predetermined condition.

If the configuration of the group changes, whether the communication by the second wireless LAN communication unit 102 is available is determined, and if the communication is available, the second wireless LAN communication unit 102 may be used for the communication between the content distribution device 100 and the second content receiving device 100B. Even if a group is released and then formed again in the same configuration, whether the communication by the second wireless LAN communication unit 102 is available is determined, and if the communication is available, the second wireless LAN communication unit 102 may be used for the communication between the content distribution device 100 and the second content receiving device 100B.

In the above embodiment, after the distribution of content data is started by the second wireless LAN communication unit 102, the communication by the second wireless LAN communication unit 102 is switched to the communication by the first wireless LAN communication unit 101 depending on the communication status. In this regard, however, before the distribution of the content data, the communication status may be checked, and depending on the communication status, the distribution of the content data may be started using the first wireless LAN communication unit 101 without using the second wireless LAN communication unit 102.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A content distribution device comprising:
   a processor; and
   a memory device in communication with the processor and storing a plurality of instructions, which, when executed by the processor, cause the content distribution device to:
      send control data or content data to a first content receiving device via a wireless communication channel in a first frequency band;
      send the content data to a second content receiving device via a wired communication channel or via a wireless communication channel in a second frequency band that is different from the first frequency band;
      send the content data in a first data format to the second content receiving device via the wired communication channel or via the wireless communication channel in the second frequency band;
      send the content data in a second data format, which has a smaller amount of data than the first data format, to the second content receiving device over the wireless communication channel in the first frequency band,
      detect a performance reduction of the wired communication channel or the wireless communication channel in the second frequency band; and
      in response to the detection, start to send the content data to the second content receiving device via the wireless communication channel in the first frequency band while sending the control data or the content data to the first content receiving device.

2. The content distribution device according to claim 1, further comprising instructions executable by the processor to cause the content distribution device to:
   send the content data via the wireless communication channel in the first frequency band to the second content receiving device depending on a communication status of the wired communication channel or the wireless communication channel in the second frequency band while the content data is sent to the second content receiving device via the wired communication channel or via the wireless communication channel in the second frequency band.

3. The content distribution device according to claim 1, wherein
   the content data is synchronized across the content distribution device, the first content receiving device, and the second content receiving device.

4. The content distribution device according to claim 1, further comprising instructions executable by the processor to cause the content distribution device to:
   select the second data format from a plurality of data formats according to an index of communication traffic of the wireless communication channel in the first frequency band.

5. The content distribution device according to claim 1, further comprising instructions executable by the processor to cause the content distribution device to:
   select the second data format from a plurality of data formats according to a number of devices that send the content data from the content distribution device over the wireless communication channel in the first frequency band.

6. The content distribution device according to claim 1, further comprising instructions executable by the processor to cause the content distribution device to:
   select the second data format from a plurality of data formats according to a number of devices that communicate over the wireless communication channel in the first frequency band.

7. The content distribution device according to claim 1, further comprising instructions executable by the processor to cause the content distribution device to:
   change a data format to be sent to the first content receiving device over the wireless communication channel in the first frequency band when the content data is sent to the second content receiving device over the wireless communication channel in the first frequency band.

8. The content distribution device according to claim 1, further comprising instructions executable by the processor to cause the content distribution device to:
   prevent downloading of predetermined data over the wireless communication channel in the first frequency band when the content data is sent to the second content receiving device over the wireless communication channel in the first frequency band.

9. A content distribution method comprising:
   sending control data or content data to a first content receiving device via a wireless communication channel in a first frequency band;
   sending the content data to a second content receiving device via a wired communication channel or via a wireless communication channel in a second frequency band that is different from the first frequency band;
   sending the content data in a first data format to the second content receiving device via the wired communication channel or via the wireless communication channel in the second frequency band;
   sending the content data in a second data format, which has a smaller amount of data than the first data format, to the second content receiving device over the wireless communication channel in the first frequency band;
   detecting a performance reduction of the wired communication channel or the wireless communication channel in the second frequency band; and
   in response to the detecting, starting to send the content data to the second content receiving device via the wireless communication channel in the first frequency band while sending the control data or the content data to the first content receiving device.

10. The content distribution method according to claim 9, further comprising:

sending the content data over the wireless communication channel in the first frequency band to the second content receiving device depending on a communication status of the wired communication channel or the wireless communication channel in the second frequency band while the content data is sent to the second content receiving device via the wired communication channel or via the wireless communication channel in the second frequency band.

11. The content distribution method according to claim 9, further comprising:

synchronizing the content data across a content distribution device, the first content receiving device, and the second content receiving device.

12. The content distribution method according to claim 9, further comprising:

selecting the second data format from a plurality of data formats according to an index of communication traffic of the wireless communication channel in the first frequency band.

13. The content distribution method according to claim 9, further comprising:

selecting the second data format from a plurality of data formats according to a number of devices that send the content data from a content distribution device over the wireless communication channel in the first frequency band.

14. The content distribution method according to claim 9, further comprising:

selecting the second data format from a plurality of data formats according to a number of devices that communicate over the wireless communication channel in the first frequency band.

15. The content distribution method according to claim 9, further comprising:

changing a data format to be sent to the first content receiving device over the wireless communication channel in the first frequency band when the content data is sent to the second content receiving device over the wireless communication channel in the first frequency band.

16. The content distribution method according to claim 9, further comprising:

preventing downloading of predetermined data over the wireless communication channel in the first frequency band when the content data is sent to the second content receiving device over the wireless communication channel in the first frequency band.

* * * * *